United States Patent [19]
Georgi et al.

[11] Patent Number: 5,916,621
[45] Date of Patent: Jun. 29, 1999

[54] THREONINE-REDUCED WHEY PROTEIN DOMINANT BABY MILK FOOD, AND PROCESS FOR MAKING SAME

[75] Inventors: Gilda Georgi, Friedrichsdorf; Günther Sawatzki, Münzenberg; Friedrich Schweikhardt, Friedrichsdorf, all of Germany

[73] Assignee: Milupa GmbH & Co. KG, Friedrichsdorf, Germany

[21] Appl. No.: 08/663,120

[22] PCT Filed: Dec. 18, 1994

[86] PCT No.: PCT/EP94/04209

§ 371 Date: Jul. 29, 1996

§ 102(e) Date: Jul. 29, 1996

[87] PCT Pub. No.: WO95/17102

PCT Pub. Date: Jun. 29, 1995

[30] Foreign Application Priority Data

Dec. 23, 1993 [DE] Germany .............. 43 44 342

[51] Int. Cl.⁶ .............. A23C 9/142; A23C 9/20; A23C 21/00
[52] U.S. Cl. .............. 426/583; 426/491; 426/656; 426/801
[58] Field of Search ............... 426/583, 801, 426/656, 491

[56] References Cited

U.S. PATENT DOCUMENTS 4,485,040  11/1984  Roger et al. .................. 260/122

FOREIGN PATENT DOCUMENTS

| 1 243 887 | 11/1988 | Canada . |
| 0 022 696 | 1/1981 | European Pat. Off. . |
| 0 226 221 | 6/1987 | European Pat. Off. . |
| 0 418 593 A2 | 3/1991 | European Pat. Off. . |
| 0 421 309 A2 | 4/1991 | European Pat. Off. . |
| 28 18 645 C2 | 11/1978 | Germany . |
| 28 22 000 | 12/1978 | Germany . |
| 239 519 A1 | 10/1986 | Germany . |

*Primary Examiner*—Helen Pratt
*Attorney, Agent, or Firm*—Bacon & Thomas

[57] ABSTRACT

A whey protein dominant baby food is prepared that may contain hydrolysed food with a reduced threonine content. This food can be obtained by adding glycomacropeptide-free or glycomacropeptide-reduced whey powder and/or whey protein concentrate as the whey proteins usually used in the production of milk baby food.

12 Claims, No Drawings

THREONINE-REDUCED WHEY PROTEIN DOMINANT BABY MILK FOOD, AND PROCESS FOR MAKING SAME

SPECIFICATION

The invention relates to whey protein dominant milk baby foods that may contain hydrolysed foods.

In the production of milk baby foods that may contain hydrolysed foods, among other things, cow's milk or constituents of cow's milk are used. Cow's milk proteins, for example, (caseins and whey proteins) are numbered among these. Cow's milk proteins, though, differ considerably from those of human milk. One of the essential differences exists in the ratio of casein to whey proteins. While cow's milk has a whey protein/casein ratio of approximately 20:80, in human milk, it is approximately 60:40 (50:50).

In order to be able to produce milk baby foods, which can also be called formulas, bovine whey proteins must be accordingly added to the cow's milk. Foods of this kind, which are called whey protein dominant foods, though, have the disadvantage that due to their higher threonine content in comparison to human milk, they lead to a perceptibly higher threonine level in the plasma of infants. With regard to this, please refer to the Journal of Pediatric Gastroenterology and Nutrition 1992, 14, pp. 450–455, for example.

These perceptibly increased threonine values are detected in all standard whey protein dominant formulas. But since the constituents of formulas should be adapted as much as possible to the composition of human milk, there is a need to reduce the threonine content in formulas.

Surprisingly, it has now been discovered that the analytically determined threonine contents in whey powders and whey protein concentrates that are added as whey proteins in the production of formulas, are significantly higher than the theoretically possible threonine content values that have been ascertained mathematically based on amino acid sequence data of the individual whey proteins. This led to the surprising realization that the increased threonine values in standard formulas must be due to the added whey proteins.

Consequently, the object of the present invention is to prepare a whey protein dominant milk baby food or formula with a reduced threonine content.

This object is attained by the teaching of claim 1.

Whey powder or whey protein concentrates that are used in the production of milk baby foods are obtained exclusively from sweet whey. Sweet whey is produced by precipitation of caseins from milk by using the rennet enzyme (chymosin).

In this precipitation, the kappa (æ)-casein in cow's milk is fractioned into para-æ-casein and glycomacropeptide (GMP). The para-æ-casein precipitates along with the other caseins (α-, β-, γ-caseins) of cow's milk. The GMP, however, remains in solution and consequently with the whey proteins. This means that whey powder or whey protein concentrates that are obtained from sweet whey (rennet whey) also still contain the GMP in addition to the actual whey proteins, which must in fact be taken into account with the caseins. The GMP surprisingly is now distinguished by a very high content of threonine. It has been calculated that whey proteins that contain the GMP of æ-casein contain approximately 50% more threonine than whey proteins that do not contain this GMP.

Consequently, in the production of formulas, which is known per se, the crux of the present invention is to add whey proteins or whey powder that do not contain any GMP or whose GMP content has been partially or completely removed.

If the intent is to use whey powder and whey protein concentrates obtained from sweet whey, then the residual GMP remaining in solution in the casein precipitation and consequently remaining with the whey proteins, must be partially or completely removed by means of suitable processes. This can be undertaken with the aid of ultra-filtration, for example. After the pH value of the sweet whey is adjusted to below 4.0, ultra-filtration is performed. A permeate obtained in this way contains the GMP, while the residue contains the concentrated whey proteins. In this manner, the GMP can be removed from sweet whey (rennet whey), for example, on a commercial scale; with regard to this, please refer to U.S. Pat. No. 5 075 424.

Furthermore, it is also possible according to the invention to use whey proteins obtained from sour whey. In sour whey, the caseins are precipitated with the aid of acids (mineral acids such as hydrochloric acid or sulfuric acid, or organic acids such as lactic acid that is produced with the aid of lactic acid bacteria). In this process, all caseins in cow's milk are precipitated out, including the complete casein. The sour whey consequently contains only the whey proteins, but not the GMP from the æ-casein.

Up to this point, though, whey powder or whey protein concentrate obtained from sour whey has not been used in the production of whey protein dominant milk baby foods or adapted formulas that may contain hydrolysed foods, because the processing of sour whey presents significantly greater technological difficulties than that of sweet whey. Previously, there was no reason for using whey proteins or whey protein concentrates obtained from sour whey since it was not yet known that GMP was responsible for the increased threonine content in milk baby foods of the prior art.

The subject of the invention is also a process for producing whey protein dominant milk baby foods according to claim 7, as well as the use of whey powder and/or whey protein concentrate obtained from sour whey or from GMP-free or GMP-reduced sweet whey to produce this kind of milk baby food.

With the aid of the whey protein used according to the invention, it is possible to increase the whey protein content in milk baby foods to correspond with human milk and to simultaneously reduce the threonine content to 25%.

In the production of hydrolysed foods, the whey proteins (from sour whey or from sweet whey after the removal of GMP) may be further hydrolysed with enzymes (for example trypsin and chymotrypsin) according to known processes.

According to a preferred embodiment, the threonine content of the milk baby food according to the invention is 4.0 to 5.0 g/100 g protein, preferably 4.3 to 4.8 g/100 g protein (relative to the proteins in the milk baby food). The GMP content is preferably less than 2 weight % relative to the total quantity of proteins present in the milk baby food. In contrast, whey protein dominant milk baby foods of the prior art contain from 5.2 to 6.0 g/100 g protein as well as a GMP content of more than 8%. The analytically determined fluctuations in the threonine determinations can be up to 5%.

The term "protein" or "proteins" used in the scope of the present application is understood to mean constituents made up of amino acids. The values for the content or for the quantity of protein or proteins have been determined with the aid of amino acid analysis and not on the basis of nitrogen determination according to Kjeldahl. In the calculation of protein quantity, namely, often the nitrogen content is determined with the aid of the Kjeldahl process; the N-value obtained in this manner is then multiplied by a known factor. However, nitrogen is also detected which does not come from constituents made up of amino acids.

The invention is explained in detail in conjunction with the following examples that describe preferred embodiments.

EXAMPLE 1

Adapted Milk Baby Food as a Spray Product (batch size 100 kg)

172.2 kg cream (with 10.2% milk fat and 11.72 kg nonfat dry milk solids) are introduced into a heatable tank with an agitator and heated to 70° C. Under intensive agitation, 30.4 kg demineralized whey powder (13.5% protein) from sour whey or sweet whey after removal of the GMP, 26.9 kg lactose, 0.025 kg taurine, 0.3 kg potassium chloride (pre-dissolved in 10 l of water at 60° C.), 0.4 kg calcium carbonate, and 0.5 kg of a mixture of minerals are added and completely dissolved in succession. 0.5 kg of emulsifier are dissolved in 11.2 kg of hot vegetable shortening mixture (50–60° C.) and added to the batch. Then, a vitamin mixture (0.5 kg) is stirred in. The finished batch is heated to 70–75° C. and homogenized at 180 bar. Then, the concentrate is heated to 95° C. by a heating device, cooled to 70° C., and spray dried.

EXAMPLE 2

Milk Baby Food Based on Hydrolysate. (batch size 100 kg)

In 100 l of hot water (approx. 70–75° C.) the following ingredients are dissolved in succession under intense agitation:

36.8 kg lactose, 14.8 kg maltodextrin, 3.0 kg starch, 7.8 kg whey protein hydrolysate (from sour whey or sweet whey after removal of the GMP), 6.5 kg casein hydrolysate, 0.09 kg reduced glutathione, 0.6 kg potassium chloride (pre-dissolved in approx. 5 l of warm water at 60° C.), 0.27 kg tripotassium citrate (pre-dissolved in approx. 5 l of water at 60° C.), 0.19 kg citric acid (pre-dissolved in approx. 3 l of hot water at 60° C.), and 1.4 kg of a mineral mixture. 2 kg of emulsifiers are completely dissolved in hot (50–60° C.) melted fat (26.3 kg) and the mixture is added to the batch. Then, the vitamin mixture (0.31 kg) is added and completely dissolved. The batch is heated to 70–75° C. and homogenized at 180–200 bar. Then, the concentrate is heated to 95° C. in a heating device and then spray dried.

We claim:

1. A whey protein dominant milk baby food containing unhydrolyzed whey protein or hydrolyzed whey protein or a mixture thereof as a whey protein additive; said milk baby food having a threonine content from about 4.0–5.0 g/100 g of protein wherein said whey protein additive is added in the form of a powder or concentrate obtained either from sweet whey in which the protein content has been modified by the selective removal of at least a portion of the GMP therefrom or from sour whey in which the amount of protein contained therein is not reduced by removal of protein therefrom.

2. The milk baby food according to claim 1, wherein the whey powder and/or whey protein concentrate is obtained from sour whey.

3. The milk baby food according to claim 1, wherein the whey powder and/or whey protein concentrate is obtained from GMP-free or GMP-reduced sweet whey.

4. The milk baby food according to claim 1, wherein the threonine content is about 4.3 to 4.8 g/100 g of protein.

5. The milk baby food according to claim 1, characterized in that the glycomacropeptide (GMP) content is less than about 2 weight %.

6. A process for producing whey protein dominant milk baby food comprising using as the whey protein whey powder and/or whey proteins obtained either from sweet whey in which the protein content has been modified by the selective removal of at least a portion of the GMP therefrom or from sour whey in which the amount of protein contained therein is not reduced by removal of protein therefrom.

7. A process for reducing the threonine content of a whey protein dominant milk baby food, comprising substituting for whey protein usually added in production of said milk baby food one or more whey proteins selected from the group consisting of glycomacropeptide(GMP)-reduced whey powder, glycomacropeptide(GMP)-free whey powder, glycomacropeptide(GMP)-reduced whey protein concentrate, or glycomacropeptide(GMP)-free whey protein concentrate, or mixtures thereof; said whey protein being obtained from sweet whey in which the protein content has been modified by the selective removal of at least a portion of the GMP therefrom or from sour whey in which the amount of protein contained therein is not reduced by removal of protein therefrom.

8. The process according to claim 7, comprising substituting, for the whey protein usually added, whey protein obtained from sour whey.

9. The process according to claim 7, comprising substituting, for the whey protein usually added, whey protein obtained from sweet whey.

10. A process for producing whey protein dominant milk baby food comprising the steps of:
   (a) obtaining sour whey from cow's milk; and
   (b) adding said sour whey without the removal of protein therefrom, to a composition of said milk baby food to which whey protein has not previously been added.

11. A process for producing whey protein dominant milk baby food comprising the steps of:
   (a) obtaining sweet whey from cow's milk;
   (b) removing glycomacropeptide (GMP) from the sweet whey obtained in step (a) by adjusting the pH of the sweet whey to below about 4.0, and ultrafiltrating to obtain GMP-free or GMP-reduced sweet whey; and
   (c) adding the GMP-free or GMP-reduced sweet whey to a composition of said milk baby food to which whey protein has not previously been added.

12. A whey protein dominant milk baby food, containing as the whey protein unhydrolyzed whey protein or hydrolyzed whey protein or a mixture thereof, wherein the improvement comprises substituting for the whey protein normally used in a whey protein dominant milk baby food, whey protein having a glycomacropepetide content of less than about 2 weight %, wherein the whey protein is either the protein of sweet whey in which the protein content has been modified by the selective removal of at least a portion of the GMP therefrom or the protein of sour whey in which the amount of protein contained therein is not reduced by removal of protein therefrom; and said whey protein dominant milk baby food has a threonine content from about 4.0–5.0 g/100 g of protein.

* * * * *